US011190655B2

(12) United States Patent
Tojo et al.

(10) Patent No.: US 11,190,655 B2
(45) Date of Patent: Nov. 30, 2021

(54) INFORMATION TRANSMISSION APPARATUS AND NON-TRANSITORY COMPUTER READABLE MEDIUM

(71) Applicant: FUJIFILM Business Innovation Corp., Tokyo (JP)

(72) Inventors: Takahiro Tojo, Kanagawa (JP); Masakazu Ketsuka, Kanagawa (JP); Toru Takahashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 143 days.

(21) Appl. No.: 16/364,187

(22) Filed: Mar. 26, 2019

(65) Prior Publication Data

US 2019/0306347 A1    Oct. 3, 2019

(30) Foreign Application Priority Data

Apr. 2, 2018    (JP) .............................. JP2018-071089

(51) Int. Cl.
| | | |
|---|---|---|
| *G06F 3/12* | (2006.01) | |
| *H04N 1/00* | (2006.01) | |
| *H04L 12/18* | (2006.01) | |
| *H04N 1/23* | (2006.01) | |

(52) U.S. Cl.
CPC ..... *H04N 1/00509* (2013.01); *H04L 12/1868* (2013.01); *H04N 1/00217* (2013.01); *H04N 1/2361* (2013.01); *H04N 1/00413* (2013.01)

(58) Field of Classification Search
CPC ........... H04N 1/00509; H04N 1/00511; H04N 1/00514; H04N 1/00217; H04N 1/2361; H04N 1/00413; H04L 12/1868
See application file for complete search history.

(56) References Cited

U.S. PATENT DOCUMENTS

| | | | | |
|---|---|---|---|---|
| 2008/0307480 | A1* | 12/2008 | Chiba | ................. H04L 12/2818 |
| | | | | 725/118 |
| 2009/0219562 | A1* | 9/2009 | Hasegawa | ......... H04N 1/00472 |
| | | | | 358/1.15 |
| 2011/0228346 | A1* | 9/2011 | Hoshino | ............ H04N 1/32374 |
| | | | | 358/442 |

(Continued)

FOREIGN PATENT DOCUMENTS

JP    H02186772    7/1990

*Primary Examiner* — Moustapha Diaby
(74) *Attorney, Agent, or Firm* — JCIPRNET (57) ABSTRACT

An information transmission apparatus includes a generating unit and a receiving unit. The generating unit generates a second instruction part when a first instruction part is selected. The first instruction part gives an instruction to perform a first transmission process of transmitting information to multiple first transmission destinations. The second instruction part gives an instruction to perform a second transmission process of transmitting the information to at least one second transmission destination among the first transmission destinations. The at least one second transmission destination is a transmission destination to which the information fails to be transmitted. The receiving unit receives change of a second transmission setting for the second transmission process. The second transmission setting is associated with the second instruction part and includes destination information of the at least one second transmission destination.

14 Claims, 8 Drawing Sheets

(56) References Cited

U.S. PATENT DOCUMENTS

2011/0261397 A1\* 10/2011 Marunouchi ......... G06F 3/1259
358/1.15
2017/0013161 A1\* 1/2017 Kawashima ....... H04N 1/00244
2018/0095992 A1\* 4/2018 Mizuno ............... G06F 11/0733

\* cited by examiner

INFORMATION TRANSMISSION APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2018-071089 filed Apr. 2, 2018.

BACKGROUND

(i) Technical Field

The present disclosure relates to an information transmission apparatus and a non-transitory computer readable medium.

(ii) Related Art

An image communication apparatus has been recently proposed which enables retransmission to be easily performed even when an error occurs in broadcast transmission in which the same image information is transmitted to multiple targets (for example, see Japanese Unexamined Patent Application Publication No. 2-186772).

An image communication apparatus described in Japanese Unexamined Patent Application Publication No. 2-186772 performs the following operations. When a button associated with multiple targets is operated to perform a broadcast by sequentially transmitting image data in an image memory to each target, if an error occurs, for example, because of a target being busy, a flag indicating that the communication to the target has aborted is set in a destination management record. A retransmission button is operated so that the image data in the image memory is transmitted to the target for which an error has occurred.

SUMMARY

Aspects of non-limiting embodiments of the present disclosure relate to provision of an information transmission apparatus and a non-transitory computer readable medium. There is a case in which, in transmission of the same information to multiple pre-registered transmission destinations by using the same settings, when transmission to some of the transmission destinations has failed or is likely to fail, the settings for the transmission destinations, to which transmission has failed or is likely to fail, are set from the beginning. Compared with such a case, the information transmission apparatus and the non-transitory computer readable medium enable reduction in the number of steps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information transmission apparatus including a generating unit and a receiving unit. The generating unit generates a second instruction part when a first instruction part is selected. The first instruction part gives an instruction to perform a first transmission process of transmitting information to multiple first transmission destinations. The second instruction part gives an instruction to perform a second transmission process of transmitting the information to at least one second transmission destination among the first transmission destinations. The at least one second transmission destination is a transmission destination to which the information fails to be transmitted. The receiving unit receives change of a second transmission setting for the second transmission process. The second transmission setting is associated with the second instruction part and includes destination information of the at least one second transmission destination.

BRIEF DESCRIPTION OF THE DRAWINGS

Exemplary embodiments of the present disclosure will be described in detail based on the following figures, wherein.

DETAILED DESCRIPTION

Exemplary embodiments of the present disclosure will be described below with reference to the drawings. In the figures, components having substantially the same functions are designated with identical reference numerals, and repeated description will be avoided.

Summary of the Exemplary Embodiments

An information transmission apparatus according to the exemplary embodiments of the present disclosure includes a generating unit and a receiving unit. The generating unit generates a second instruction part when a first instruction part is selected. The first instruction part gives an instruction to perform a first transmission process of transmitting information to multiple first transmission destinations. The second instruction part gives an instruction to perform a second transmission process of transmitting the information to at least one second transmission destination among the first transmission destinations. The at least one second transmission destination is a transmission destination to which the information fails to be transmitted. The receiving unit receives change of a second transmission setting for the second transmission process. The second transmission setting is associated with the second instruction part and includes destination information of the at least one second transmission destination.

The "information" includes documents, images, and voice. A "transmission process" is a process of transmitting information from an apparatus, which has the information, to a registered transmission destination(s). When there are multiple transmission destinations, the same information is transmitted to the transmission destinations by using the same settings. The transmission process includes mail transmission, fax transmission, and storage in a storage destination, such as a folder or a memory. The expression "a transmission setting for a transmission process" includes transmission destination information such as the mail address or the fax number of a transmission destination, transmission conditions (such as the protocol, wired/wireless, and use of encryption), and transmission information (such as the file size, the file format, and the compression rate).

The case in which "the information fails to be transmitted" indicates the case in which a transmission instruction is received from a user but the transmission fails. The case of failure of transmission includes the following cases.

(1) The case in which a transmission process actually processed results in failure of the transmission (Examples of the reason why the transmission fails include not only the case in which the transmission fails because of the line being busy or a trouble of communication channel, but also the case in which the transmission destination information is not present or has been changed, and the case in which the transmission fails because of a wrong transmission condition or wrong transmission destination information).

(2) The case in which it is found, in a check before an actual transmission process, that transmission is not possible (such as the case in which it is determined, in an error check, that transmission is not possible, or the case in which it is found that the destination information has been changed). Specifically, this corresponds to the case in which, after the destination information, which is to be used in the transmission process, has been selected from the original destination table and has been copied, the destination information in the original destination table has been changed.

An "instruction part" indicates a part that illustrates, on a display screen, the function of a transmission process by using a drawing, a graphic symbol, characters, and/or the like, and that gives an instruction to perform the transmission process. An instruction part may be an icon, or a button with a symbol, text, graphics or a combination of the above.

The information transmission apparatus may be, for example, an image forming apparatus, such as a multifunction device or a facsimile machine, or an information processing apparatus, such as a multifunction portable phone (smartphone), a personal computer (PC), or a tablet terminal.

Exemplary Embodiment

Figure 1:
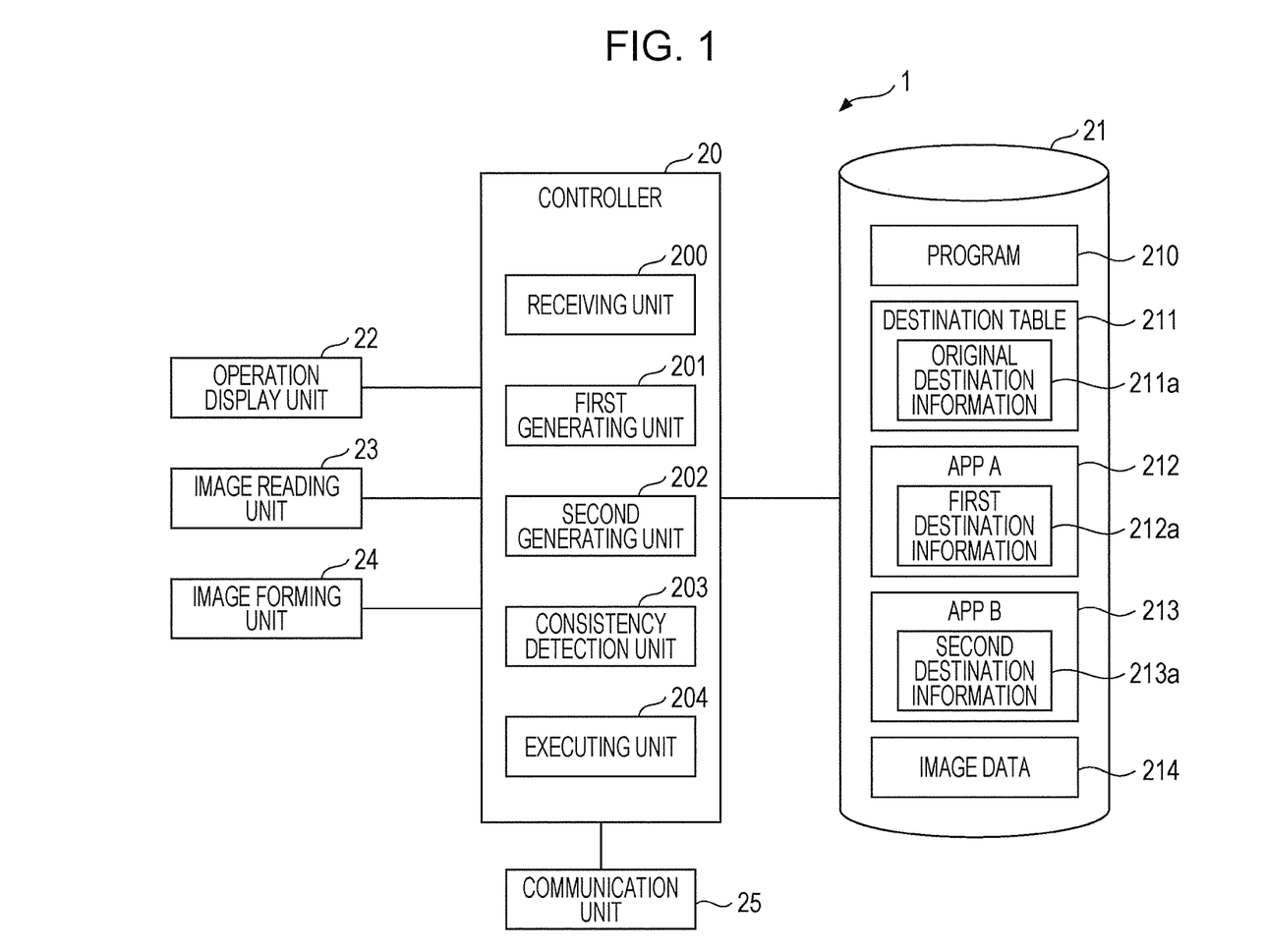
FIG. 1 is a block diagram illustrating a control system example of an image forming apparatus according to an exemplary embodiment of the present disclosure.

FIG. 1 is a block diagram illustrating a control system example of an image forming apparatus according to an exemplary embodiment of the present disclosure. An image forming apparatus 1 is, for example, a multifunction device having multiple functions, such as scanning, printing, copying, electronic mail, and faxing. The image forming apparatus 1 includes a controller 20, a storage unit 21, an operation display unit 22, an image reading unit 23, an image forming unit 24, and a communication unit 25. The multifunction device is an exemplary information transmission apparatus. Herein, a user is an exemplary user other than an administrator. An "operator" is also used for the case in which both of an administrator and a user are to be included.

The controller 20 includes a central processing unit (CPU) and an interface. The CPU operates according to a program 210, which functions as a receiving unit 200, a first generating unit 201, a second generating unit 202, a consistency detection unit 203, an executing unit 204, and the like. The units 200 to 204 will be described in detail below.

The storage unit 21 includes a read only memory (ROM), a random access memory (RAM), and a hard disk. The storage unit 21 stores various information including the program 210, a destination table 211 in which original destination information 211a is registered by an administrator, a first application (hereinafter also referred to as a "first app") 212, a second application (hereinafter also referred to as a "second app") 213, and image data 214. The application name of the first application 212 and that of the second application 213 are "app A" and "app B", respectively.

In the first application 212, first destination information 212a is registered in advance. In the second application 213, second destination information 213a is registered in advance. The first application 212 and the second application 213 perform a transmission process of transmitting the same information by using the same settings to one or more destinations included in the first destination information 212a and the second destination information 213a, respectively, which have been registered.

The first destination information 212a is generated, for example, by an administrator or a user selecting from the original destination information 211a in the destination table 211 and copying the selected information. The second destination information 213a also includes a transmission destination which is determined, before transmission, to be a transmission destination to which information is not capable of being transmitted.

Examples of the first application 212 and the second application 213 include an application performed at once without displaying a screen for confirming the settings and an application performed after displaying a screen for confirming the settings and receiving the confirmation.

A destination included in the original destination information 211a is an exemplary original transmission destination. A destination included in the first destination information 212a is an exemplary first transmission destination. A destination included in the second destination information 213a is an exemplary second transmission destination.

The operation display unit 22 has a touch panel display obtained by disposing a touch panel on a display unit such as a liquid-crystal display. The operation display unit 22 displays a screen such as a menu screen on the display unit, and receives operations on the touch panel from an operator. On the menu screen, an icon including an application name is displayed. Selection of an icon causes a corresponding one of the applications 212 and 213 to activate. An icon is an exemplary instruction part.

The image reading unit 23 includes an automatic document feeder provided on a document table, and a scanner that reads image data from a document disposed on the document table or a document conveyed by the automatic document feeder. The image reading unit 23 stores the image data 214, which has been read, in the storage unit 21.

The image forming unit 24 forms a monochrome image or a color image on a recording medium such as a sheet, for example, by using an electrophotographic system or an inkjet system.

The communication unit 25 receives/transmits information from/to an external apparatus, such as an administrator terminal apparatus used by an administrator over a network, or a user terminal apparatus used by a user, through electronic mail, a facsimile, or the like. Examples of a network include a local-area network (LAN), the Internet, and a public network over which data reception/transmission is performed through wired communication, wireless communication, and the like.

Figure 2:
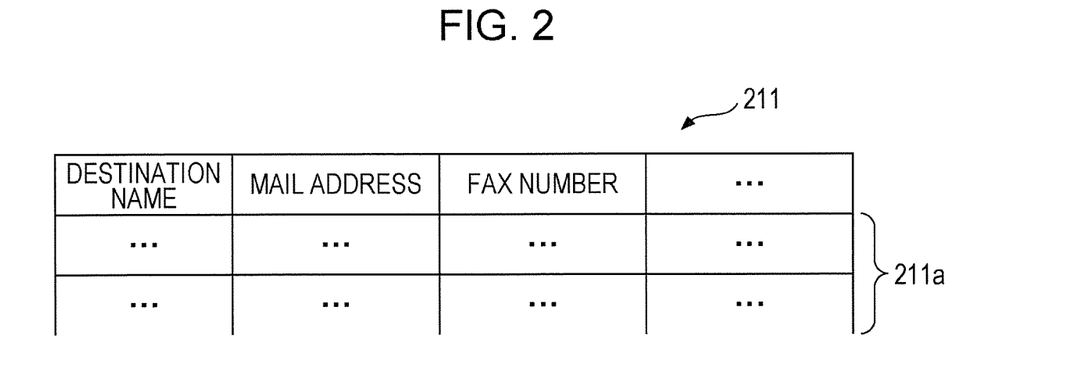
FIG. 2 is a diagram illustrating an exemplary destination table.

FIG. 2 is a diagram illustrating an exemplary destination table. In the destination table 211, the original destination information 211a, such as destination names, mail addresses, and fax numbers, is registered. The destination table 211 has items of "DESTINATION NAME", "MAIL ADDRESS", "FAX NUMBER", and the like. In the item "DESTINATION NAME", a destination name, such as a company name or the name of an employee in a company, of a transmission destination through electronic mail or a facsimile is registered. In the item "MAIL ADDRESS", an electronic mail address is registered. In the item "FAX NUMBER", a facsimile number is registered. Only an administrator is allowed to edit the original destination information 211a in the destination table 211. A user other than an administrator is not allowed to edit the original destination information 211a. The destination table 211 may need to be edited, for example, due to a personnel change, retirement, or employment of an employee.

The units 200 to 204 of the controller 20 will be described.

The receiving unit 200 receives an operation on the operation display unit 22 from an administrator or a user. The receiving unit 200 does not receive editing, by someone other than an administrator, of the transmission settings held by the first application 212. When a second icon 100b is selected, the receiving unit 200 receives change of the transmission settings for a destination to which transmission has failed. At that time, the receiving unit 200 receives change of the transmission settings, including the second destination information 213a, without a transition between screens. Specifically, when there is a mismatch between the original destination information 211a and the first destination information 212a, the receiving unit 200 displays the destination information in which the mismatch is present and a message that a mismatch is present. Thus, the receiving unit 200 receives change of the transmission settings including the second destination information 213a.

When the receiving unit 200 receives an instruction to modify the transmission settings, which have been set for the first application 212, in accordance with the change of the transmission settings, which have been set for the second application 213, the receiving unit 200 may delete or gray out the second icon 100b on the screen after the modification using the transmission settings. The receiving unit 200 may transmit, to an external apparatus, the transmission settings held by the second application 213, and may receive change of the transmission settings from the external apparatus.

The first generating unit 201 generates the first application 212 on the basis of an operation on the operation display unit 22 performed by an administrator or a user. The generating unit 202 generates a first icon (see FIG. 3A) corresponding to the first application 212 to display the first icon on a menu screen 10.

Figure 3A:
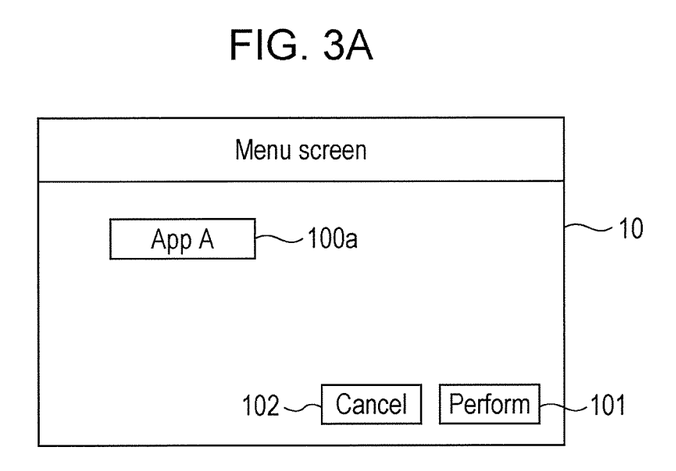
FIGS. 3A and 3B are diagrams illustrating exemplary menu screens.

A first icon 100a is associated with the transmission settings including the first destination information 212a. The first icon 100a is used to store the image data 214 in the storage unit 21 in execution of a transmission process. The second icon 100b is used to give an instruction to transmit the image data 214 stored in the storage unit 21 in execution of the transmission process. The first icon 100a is an exemplary first instruction part.

The second generating unit 202 generates the second application 213 for transmitting information to a destination to which transmission of the information has failed in execution of the first application 212. When a mismatch is present between the original destination information 211a and the first destination information 212a, the second generating unit 202 determines that information fails to be transmitted, and includes, in the second destination information 213a, a destination for which the mismatch is present. The second generating unit 202 generates a second icon (see FIG. 3B) corresponding to the second application 213 to display the second icon on the menu screen 10. The second icon 100b is associated with the transmission settings including the second destination information 213a. The second icon 100b is an exemplary second instruction part.

The second application 213 is generated so as to be (1) partly the same as the first application 212, or (2) partly different from the first application 212, as described below.

(1) Partly the Same

The expression "partly the same" indicates that the settings and the transmission target are the same except the destination information. The second application 213 is generated as an application having the same settings as those of the first application 212. Thus, time and effort in a setting operation are reduced. The second application 213 may hold information (for example, a document obtained through scanning) about the target transmitted when the first application 212 is performed. In this case, when transmission using the second application 213 is completed, the same document is unlikely to be transmitted again. Therefore, it is desirable to delete the second application 213.

(2) Partly Different

The expression "partly different" indicates that the transmission target, the corresponding icon, or the settings are different. For example, when a color image fails to be transmitted due to a constraint on communications traffic of a transmission destination, a monochrome image into which the color image is changed and which produces a smaller amount of communications traffic may be transmitted. In addition, to differentiate the applications from each other, the display forms of the respective icons may be changed. Further, parameters may be different from those of the first application 212. Examples of the parameters include the destination information (because of exclusion of a destination to which transmission fails to be performed, or because of change of the transmission destination), and a setting indicating whether the application is to be performed at once or after confirmation (because changing an application performed at once into an application performed after confirmation makes transmission safer).

When the first application 212 is activated, the consistency detection unit 203 determines whether or not a difference is present between the original destination information 211a registered in the destination table 211 and the first destination information 212a set in the activated first application 212. Examples of the case in which a difference is present include the case in which destination information such as a mail address is different, and the case in which, while a destination is present in the first destination information 212a, the destination is not present in the original destination information 211a.

The executing unit 204 controls the image reading unit 23, the image forming unit 24, the communication unit 25, and the like to perform a process specified by using the settings held by a selected application.

Operations According to the Exemplary Embodiment

Exemplary operations of the image forming apparatus 1 will be described.

(1) A Flow Performed by the First Application

A flow performed by the first application 212 will be described with reference to FIGS. 3A to 4 according to the flowchart in FIG. 5.

When a user activates the image forming apparatus 1, the controller 20 displays a menu screen on the operation display unit 22.

FIG. 3A is a diagram illustrating an exemplary menu screen. The menu screen 10 includes the first icon 100*a* for an application whose name is "app A", a "Perform" button 101 used to, after selection of the first icon 100*a*, give an instruction to perform the corresponding first application 212, and a "Cancel" button 102 used to cancel the selection of the first icon 100*a*. The menu screen 10 may include an icon used to give an instruction to perform another application.

The user selects the first icon 100*a* on the menu screen 10 to activate the first application 212 (S1).

When the first application 212 is activated, the consistency detection unit 203 determines whether or not a difference is present between the original destination information 211*a* registered in the destination table 211 and the first destination information 212*a* set for the activated first application 212 (S2).

If a difference is present, the consistency detection unit 203 displays, on the operation display unit 22, a caution screen indicating that there is a destination for which a difference is present (S3).

Figure 4:
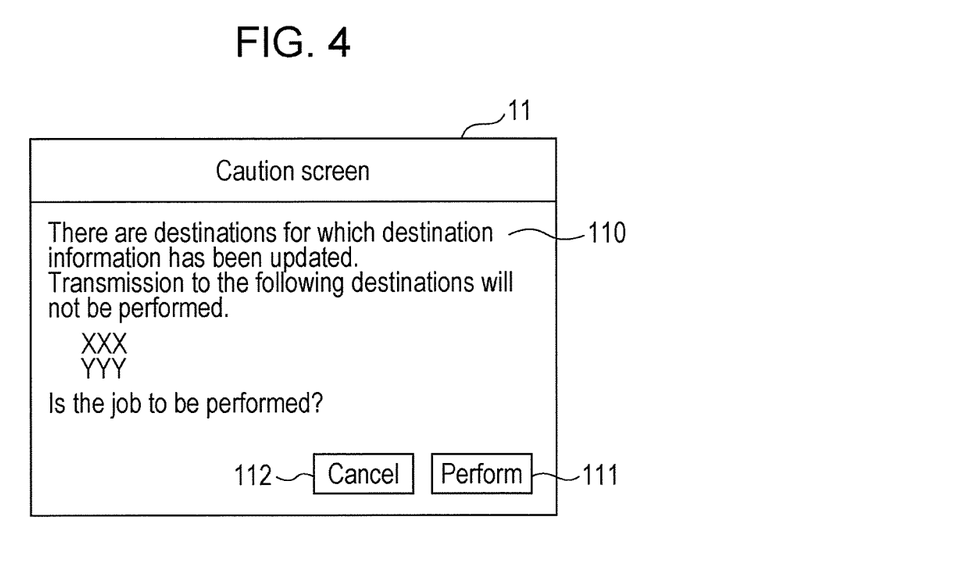
FIG. 4 is a diagram illustrating an exemplary caution screen.

FIG. 4 is a diagram illustrating an exemplary caution screen. A caution screen 11 includes a message 110, a "Perform" button 111, and a "Cancel" button 112. The message 110 describes that "There are destinations for which destination information has been updated. Transmission to the following destinations will not be performed . . . . Is the job to be performed?" The "Perform" button 111 is used to give an instruction to perform the job. The "Cancel" button 112 is used to cancel execution of the job. The job indicates a transmission process performed by the first application 212. The destinations in FIG. 4 include not only a destination to which transmission produces a communication error, but also a destination to which information will be successfully transmitted but at which the person will not receive the information, for example, because of retirement.

It is determined whether or not an instruction to perform the job has been given (S4). If an instruction to perform the job has been given through an operation on the "Perform" button 111 (Yes in S4), the job is performed (S5). The executing unit 204 reads image data from a document by using the image reading unit 23, and stores the image data 214 in the storage unit 21. The executing unit 204 controls the communication unit 25 so that the image data 214 is transmitted to each destination included in the first destination information 212*a*. The communication unit 25 transmits the image data 214 simultaneously or sequentially over a network to each destination included in the first destination information 212*a*.

The consistency detection unit 203 determines whether or not there is a destination to which transmission has failed (S6). If there is a destination to which transmission has failed (Yes in S6), the second generating unit 202 generates the second application 213 in which the transmission settings including the second destination information 213*a* are registered for the destination to which transmission has failed, and generates the second icon 100*b* (S7). The second generating unit 202 stores the generated second application 213 in the storage unit 21. When the second application 213 is generated, the second icon 100*b* for "app B" is displayed on the menu screen 10 as illustrated in FIG. 3B.

If no difference is present in step S2 described above (No in S2), the process proceeds to step S5 in which the job is performed. If the "Cancel" button 112 is operated in step S4 described above (No in S4), or if no destinations to which transmission has failed are present in step S6 described above (No in S6), the process ends.

A user may be notified of generation of the second icon 100*b* and the second application 213 through screen display, voice, electronic mail, or the like. In addition, to make a user recognize generation of the second icon 100*b* easily, the second icon 100*b* may have a color or shape different from that of the first icon 100*a* (for example, one is rectangular and another is circular), and a mark may be attached to the second icon 100*b*. Further, the second icon 100*b* may blink. Furthermore, the second application 213 may be compulsively performed when a user logs in.

(2) A Flow Performed by the Second Application

A flow performed by the second application 213 will be described with reference to FIGS. 6 to 8 according to the flowchart in FIG. 9.

Figure 3B:
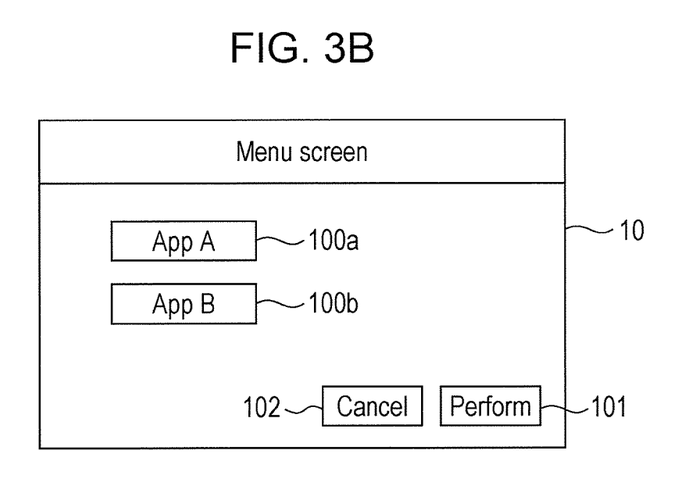

A user operates the operation display unit 22 to select the second icon 100*b* on the menu screen 10 in FIG. 3B (S11).

There may be various execution timings for the second application. Like the operations in the exemplary embodiment, the second application 213 may be activated after execution of the first application 212 without logout. Alternatively, the second application 213 may be activated after execution of the first application 212, logout, and then login. Alternatively, after execution of the first application 212 and logout, login may cause automatic activation of the second application 213. This method facilitates a user's recognition of generation of the second application 213 even if the user forgets the generation of the second application 213.

When the second application 213 is activated, the receiving unit 200 displays a confirmation screen on the operation display unit 22 (S12).

Figure 6:
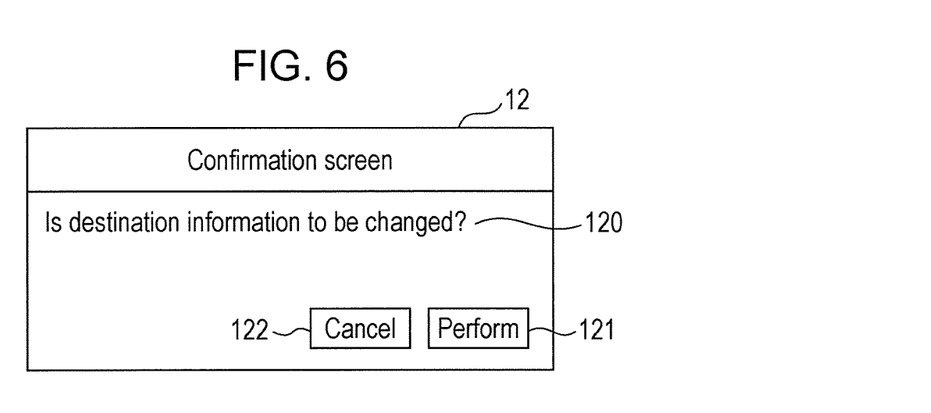
FIG. 6 is a diagram illustrating an exemplary confirmation screen.

FIG. 6 is a diagram illustrating an exemplary confirmation screen. A confirmation screen 12 includes a message 120, a "Perform" button 121, and a "Cancel" button 122. The message 120 describes "Is destination information to be changed?" The "Perform" button 121 is used to give an instruction to change the second destination information 213*a*. The "Cancel" button 122 is used to cancel change of the second destination information 213*a*.

It is determined whether or not an instruction to change the second destination information 213*a* has been given (S13). If the "Perform" button 121 is operated (Yes in S13), a destination-information change screen is displayed on the operation display unit 22, and the destination information is made to be changed (S14). At that time, without a transition between screens, the destination-information change screen may be displayed as a pop-up screen.

Figure 7:
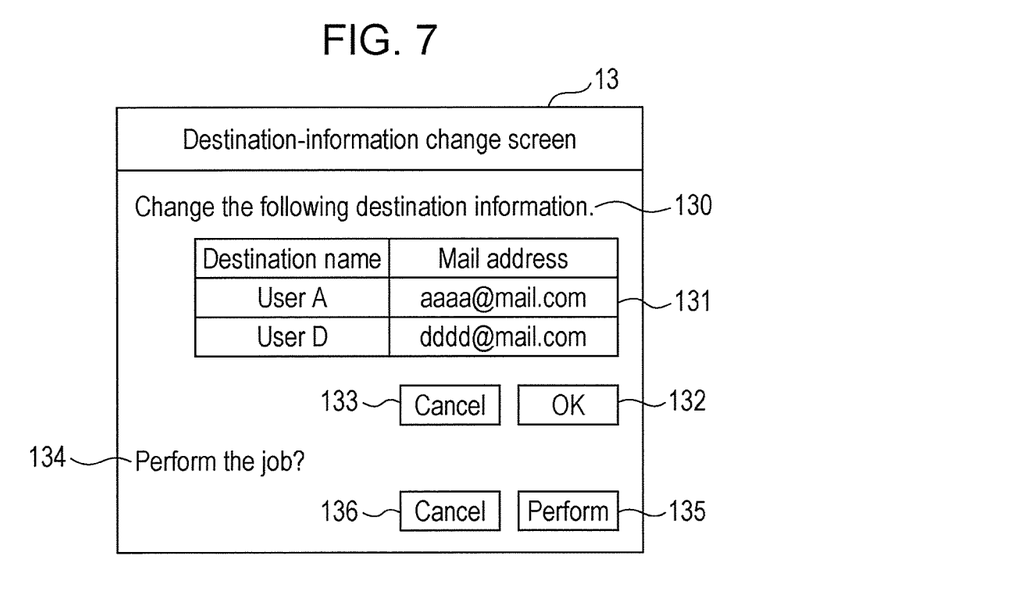
FIG. 7 is a diagram illustrating an exemplary destination-information change screen.

FIG. 7 is a diagram illustrating an exemplary destination-information change screen. A destination-information change screen 13 includes a message 130, change-target destination information 131, an "OK" button 132, a "Cancel" button 133, a message 134, a "Perform" button 135, and a "Cancel" button 136. The message 130 describes that "Change the following destination information." The message 134 describes that "Perform the job?" The "Perform" button 135 is used to give an instruction to perform the job.

The "Cancel" button 136 is used to cancel execution of the job. The job indicates a transmission process performed by the second application 213.

The change-target destination information 131 may describe the reason why the transmission has not been performed, and may be also expressed by using a color indicating the reason. For example, a destination to which transmission is put on hold due to change of the original destination information 211a may be expressed by using a certain color, and a destination to which transmission has failed due to communication error is expressed by using a different color. In this case, the destinations may be sorted according to their reasons or their colors.

After the change-target destination information 131 is changed, when the "OK" button 132 is operated, the second generating unit 202 changes the second destination information 213a held by the second application 213. In the case in FIG. 7, the change-target destination information 131 includes two destination names of user A and user D, and their mail addresses.

It is determined whether or not an instruction to perform the job has been given (S15). If an instruction to perform the job has been given through an operation of the "Perform" button 135 (Yes in S15), the job is performed (S16). The executing unit 204 controls the communication unit 25 so that the image data 214 which has been read in execution of the first application 212 and which has been stored in the storage unit 21 is transmitted to each destination included in the second destination information 213a. The communication unit 25 transmits the image data 214 simultaneously or sequentially over a network to each destination included in the second destination information 213a. A user may select whether or not the image data 214 obtained in execution of the first application 212 is to be used.

After the job is performed, the receiving unit 200 displays a confirmation screen on the operation display unit 22 (S17).

Figure 8:
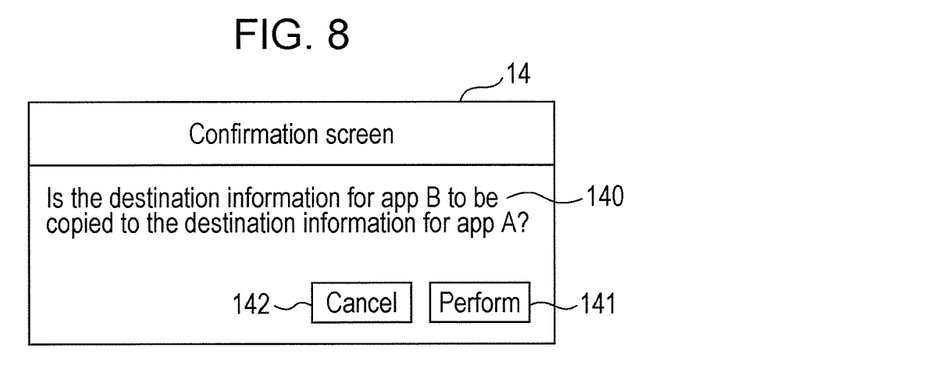
FIG. 8 is a diagram illustrating an exemplary confirmation screen.
Figure 9:
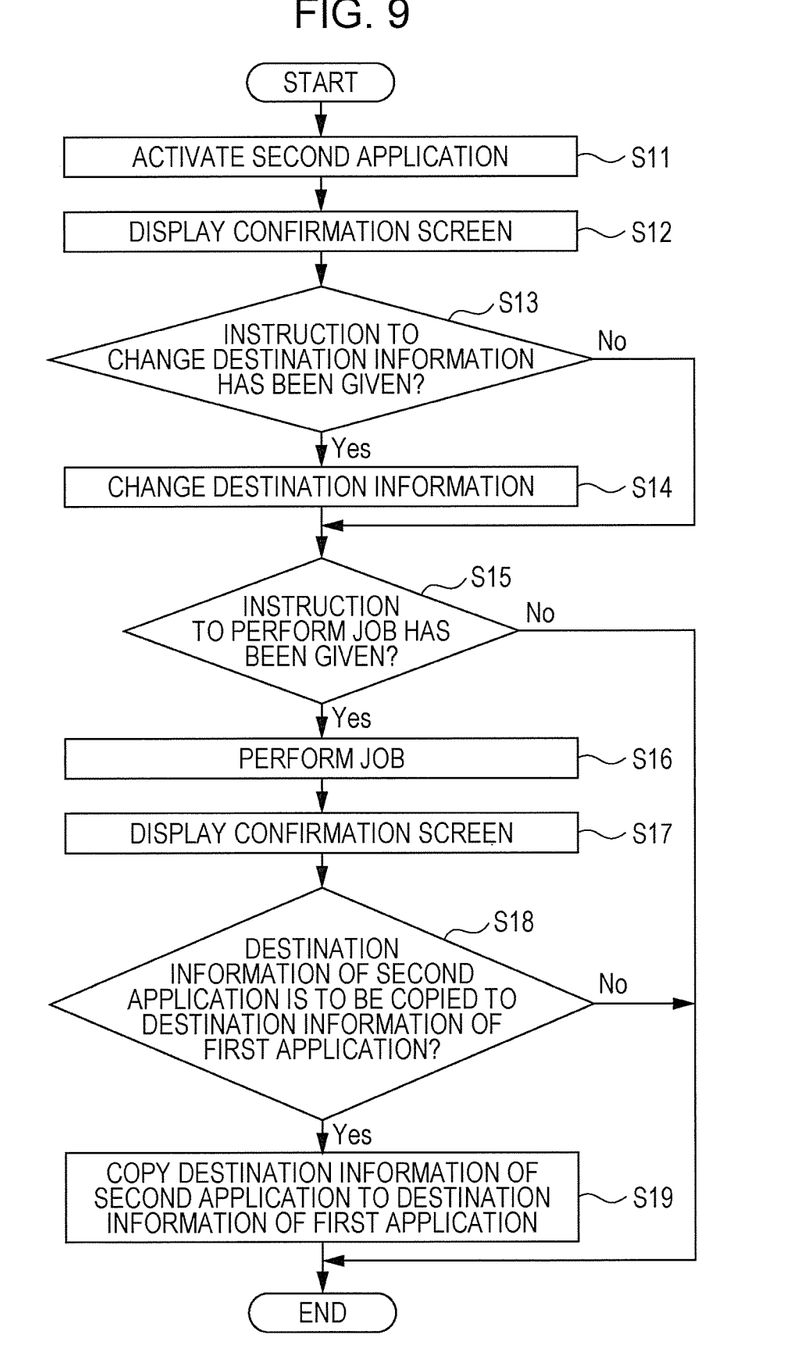
FIG. 9 is a flowchart illustrating an exemplary flow performed by a second application.

FIG. 8 is a diagram illustrating an exemplary confirmation screen. A confirmation screen 14 includes a message 140, a "Perform" button 141, and a "Cancel" button 142. The message 140 describes that "Is the destination information for app B to be copied to the destination information for app A?" The "Perform" button 141 is used to give an instruction to perform the copy operation. The "Cancel" button 142 is used to cancel execution of the copy operation. The copy operation indicates that the first destination information 212a is modified in accordance with changed information in the second destination information 213a.

It is determined whether or not an instruction to perform the copy operation has been given (S18). If the "Perform" button 141 is operated (Yes in S18), the second destination information 213a held by the second application 213 is copied to the first destination information 212a held by the first application 212 (S19).

In step S13 described above, if the destination information is not to be changed (No in S13), the process proceeds to step S15 in which it is determined whether or not the job is to be performed. In step S15 described above, if an instruction to perform the job has not been given, (No in S15), or if an instruction to perform the copy operation has not been given in step S18 described above (No in S18), the process ends.

The information to be copied may be selected by a user. In addition, a user may select whether the second icon 100b is to be deleted or is to remain.

First Modified Example

Figure 10:
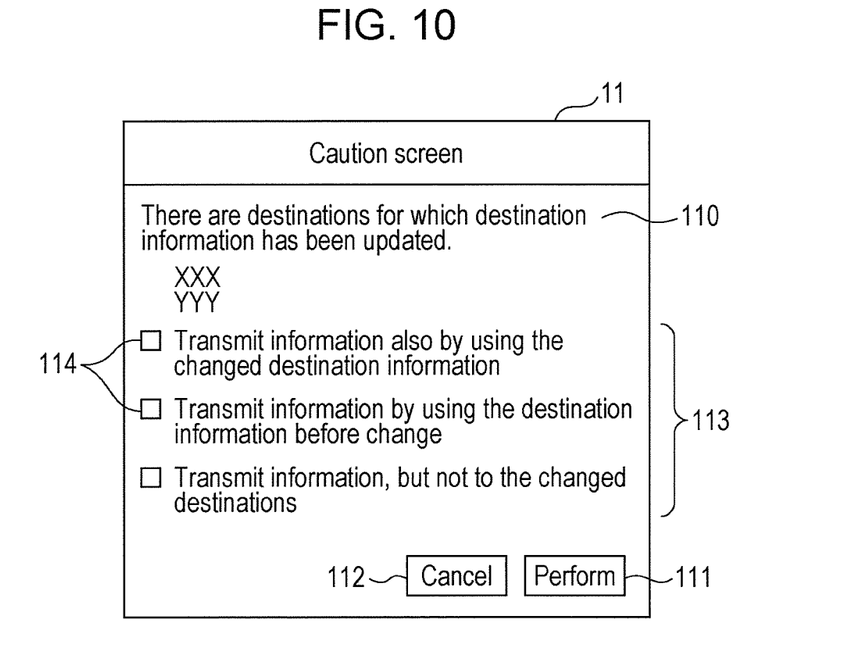
FIG. 10 is a diagram illustrating a modified example of the caution screen in FIG. 4.

FIG. 10 is a diagram illustrating a modified example of the caution screen in FIG. 4. Similarly to FIG. 4, the caution screen 11 in FIG. 10 includes the message 110, the "Perform" button 111, and the "Cancel" button 112. The caution screen 11 further includes checkboxes 114 for selecting one of transmission options 113 of "Transmit information also by using the changed destination information", "Transmit information by using the destination information before change", and "Transmit information, but not to the changed destinations". According to the caution screen 11 in FIG. 10, one of the transmission options 113 may be selected, for execution, by using the checkboxes 114.

Second Modified Example

Figure 5:
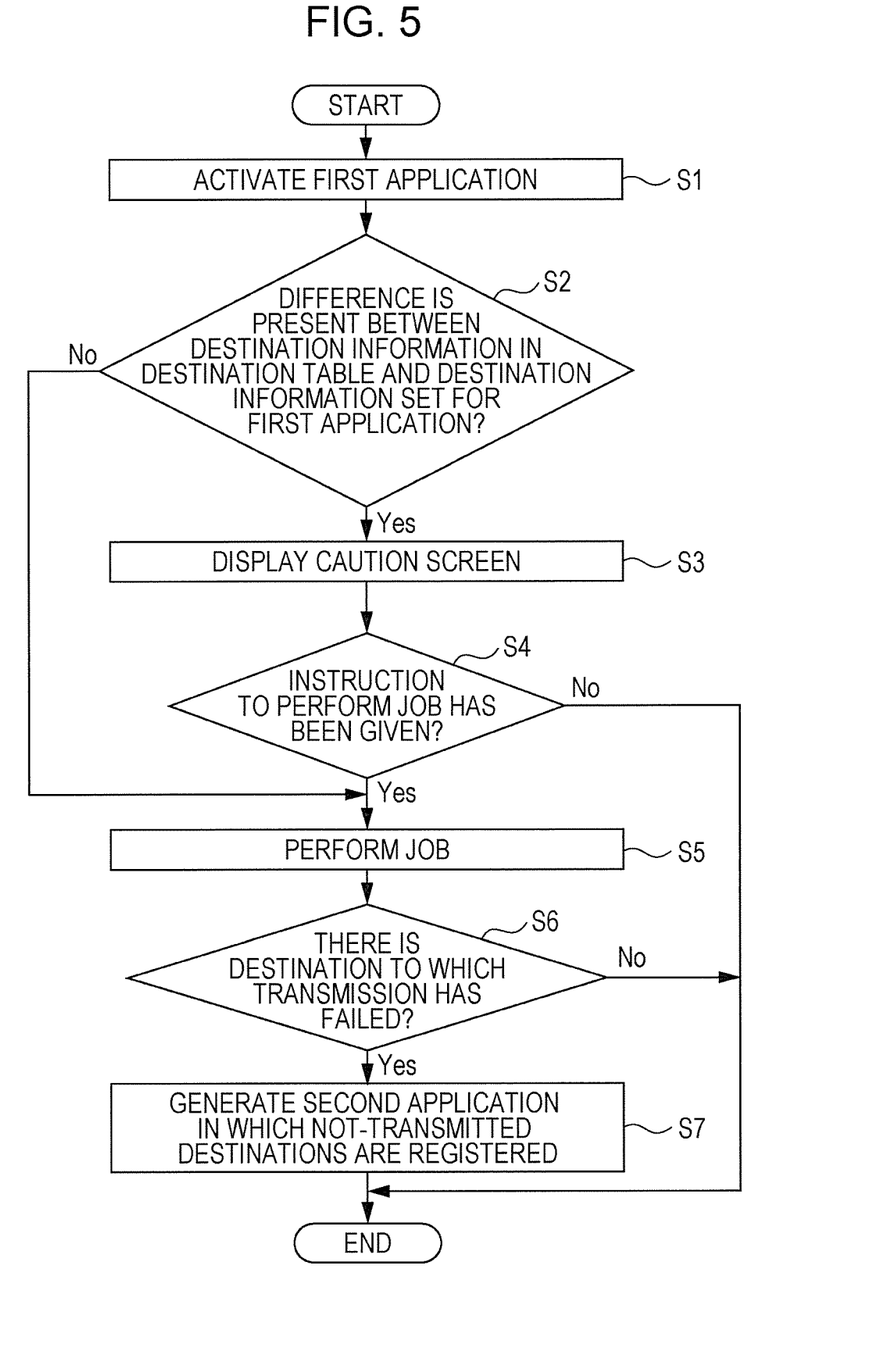
FIG. 5 is a flowchart illustrating an exemplary flow performed by a first application.

In the flowchart in FIG. 5, before the determination about an instruction to perform the job (S4), a destination-information change screen as in FIG. 7 may be displayed on the operation display unit 22 and change of destinations may be received. This enables suppression of occurrence of erroneous transmission to a partner who is not present, for example, due to retirement.

Exemplary embodiments of the present disclosure are described above. However, exemplary embodiments of the present disclosure are not limited to the above-described exemplary embodiments. Various changes may be made for execution without departing from the gist of the present disclosure. For example, in the exemplary embodiments described above, the applications are stored in the storage unit 21 of the image forming apparatus 1, but may be stored in an external server such as a cloud server. In the exemplary embodiments described above, the applications hold the settings, but may refer to the settings.

A part or all of each unit of the controller 20 may be formed by using a hardware circuit, such as a field programmable gate array (FPGA) or an application specific integrated circuit (ASIC).

Some of the components according to the above-described exemplary embodiments may be omitted or changed without departing from the gist of the present disclosure. Steps may be, for example, added, deleted, changed, and replaced in the flow according to the above-described exemplary embodiments without departing from the gist of the present disclosure. In addition, the program used in the above-described exemplary embodiments may be provided by recording the program in a computer-readable recording medium such as a compact disc-read-only memory (CD-ROM). Alternatively, the program used in the above-described exemplary embodiments may be stored in an external server such as a cloud server, and may be used over a network.

What is claimed is:

1. An information transmission apparatus comprising:
a processor configured to:
generate a second instruction part when a first instruction part is selected, the first instruction part giving an instruction to perform a first transmission process of transmitting information to a plurality of first transmission destinations, the second instruction part giving an instruction to perform a second transmission process of transmitting the information to at least one second transmission destination among the plurality of first transmission destinations, the at least one second transmission destination being a transmission destination to which the information fails to be transmitted; and
receive change of a second transmission setting for the second transmission process, the second transmission setting being associated with the second instruction part and including destination information of the at least one second transmission destination,
wherein the plurality of first transmission destinations are obtained by selecting from a plurality of original transmission destinations and copying the selected original transmission destinations, and
wherein, when there is a mismatch between the plurality of original transmission destinations and the plurality of first transmission destinations, the processor determines that the information fails to be transmitted, and sets, as the at least one second transmission destination, a transmission destination for which the mismatch is present.

2. The information transmission apparatus according to claim 1,
wherein the at least one second transmission destination includes a destination to which the information is determined, before transmission, to fail to be transmitted.

3. The information transmission apparatus according to claim 2,
wherein the processor does not receive editing of a first transmission setting performed by a person other than an administrator, the first transmission setting being associated with the first instruction part and including destination information of the plurality of first transmission destinations.

4. The information transmission apparatus according to claim 1,
wherein the processor displays a message along with the transmission destination for which the mismatch is present, the message describing that there is a mismatch, and receives change of the second transmission setting including the destination information of the at least one second transmission destination.

5. The information transmission apparatus according to claim 4,
wherein the processor does not receive editing of a first transmission setting performed by a person other than an administrator, the first transmission setting being associated with the first instruction part and including destination information of the plurality of first transmission destinations.

6. The information transmission apparatus according to claim 1,
wherein the processor does not receive editing of a first transmission setting performed by a person other than an administrator, the first transmission setting being associated with the first instruction part and including destination information of the plurality of first transmission destinations.

7. The information transmission apparatus according to claim 1,
wherein the processor receives change of the second transmission setting without a transition between screens, the second transmission setting being associated with the second instruction part.

8. The information transmission apparatus according to claim 1,
wherein the processor generates the second instruction part as a part corresponding to a second application different from a first application corresponding to the first instruction part.

9. The information transmission apparatus according to claim 8,
wherein, when an instruction is received, the instruction indicating that the first transmission setting be modified in accordance with change of the second transmission setting, the processor performs the modification in accordance with the second transmission setting, and then deletes the second instruction part from a screen, the second transmission setting being set for the second application, the first transmission setting being set for the first application.

10. The information transmission apparatus according to claim 1,
wherein the processor transmits, to an external apparatus, the second transmission setting associated with the second instruction part, and receives change of the second transmission setting from the external apparatus.

11. The information transmission apparatus according to claim 1,
wherein the first instruction part stores the information in a storage in execution of the first transmission process, and the second instruction part gives an instruction to transmit the information stored in the storage in execution of the first transmission process.

12. The information transmission apparatus according claim 1,
wherein, when the second instruction part is selected, the processor receives change of the second transmission setting.

13. A non-transitory computer readable medium storing a program causing a computer to execute a process comprising:
generating a second instruction part when a first instruction part is selected, the first instruction part giving an instruction to perform a first transmission process of transmitting information to a plurality of first transmission destinations, the second instruction part giving an instruction to perform a second transmission process of transmitting the information to at least one second transmission destination among the plurality of first transmission destinations, the at least one second transmission destination being a transmission destination to which the information fails to be transmitted; and
receiving change of a second transmission setting for the second transmission process, the second transmission setting being associated with the second instruction part and including destination information of the at least one second transmission destination,
wherein the plurality of first transmission destinations are obtained by selecting from a plurality of original transmission destinations and copying the selected original transmission destinations, and
wherein, when there is a mismatch between the plurality of original transmission destinations and the plurality of first transmission destinations, it is determined that the information fails to be transmitted, and a transmission destination for which the mismatch is present is set as the at least one second transmission destination.

14. An information transmission apparatus comprising:
means for generating a second instruction part when a first instruction part is selected, the first instruction part giving an instruction to perform a first transmission process of transmitting information to a plurality of first transmission destinations, the second instruction part giving an instruction to perform a second transmission process of transmitting the information to at least one second transmission destination among the plurality of first transmission destinations, the at least one second transmission destination being a transmission destination to which the information fails to be transmitted; and means for receiving change of a second transmission setting for the second transmission process, the second transmission setting being associated with the second instruction part and including destination information of the at least one second transmission destination, wherein the plurality of first transmission destinations are obtained by selecting from a plurality of original transmission destinations and copying the selected original transmission destinations, and wherein, when there is a mismatch between the plurality of original transmission destinations and the plurality of first transmission destinations, it is determined that the information fails to be transmitted, and a transmission destination for which the mismatch is present is set as the at least one second transmission destination.

\* \* \* \* \*